March 3, 1931. A. B. SCHUPP 1,795,236
MATERIAL INJECTOR
Original Filed Oct. 31, 1925 2 Sheets-Sheet 1
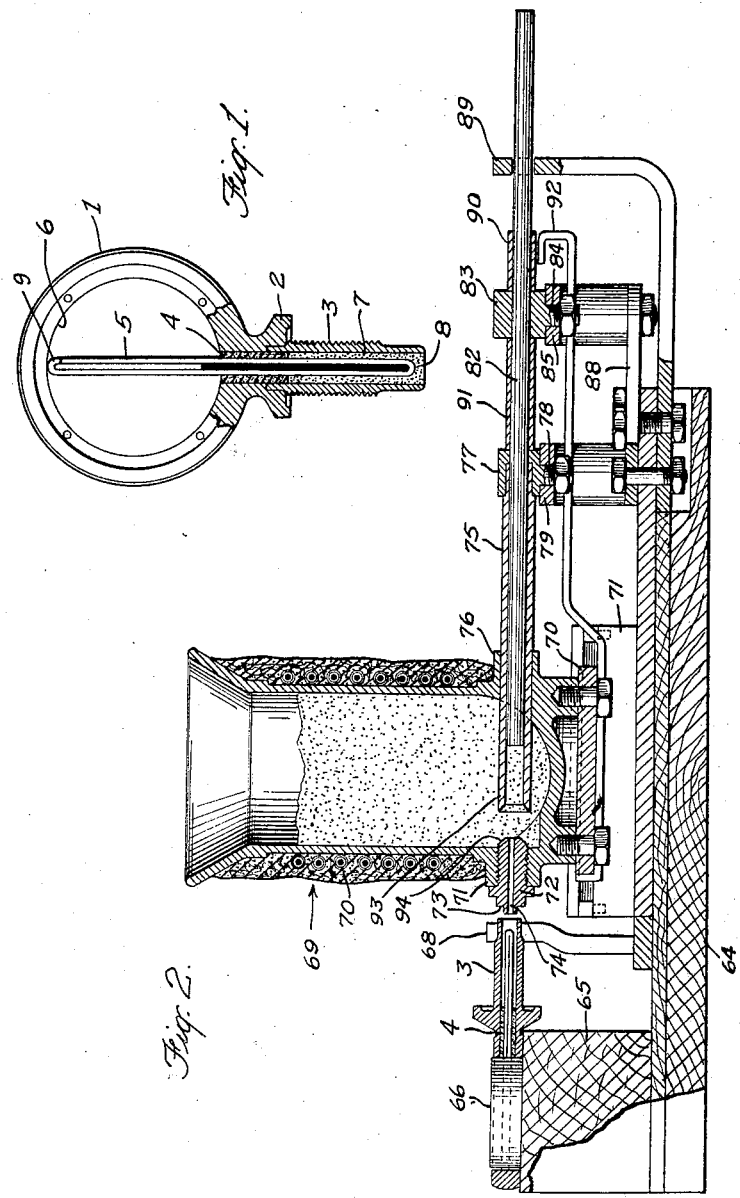
INVENTOR
ALFRED B. SCHUPP
BY
ATTORNEY March 3, 1931. A. B. SCHUPP 1,795,236
MATERIAL INJECTOR
Original Filed Oct. 31, 1925  2 Sheets-Sheet 2
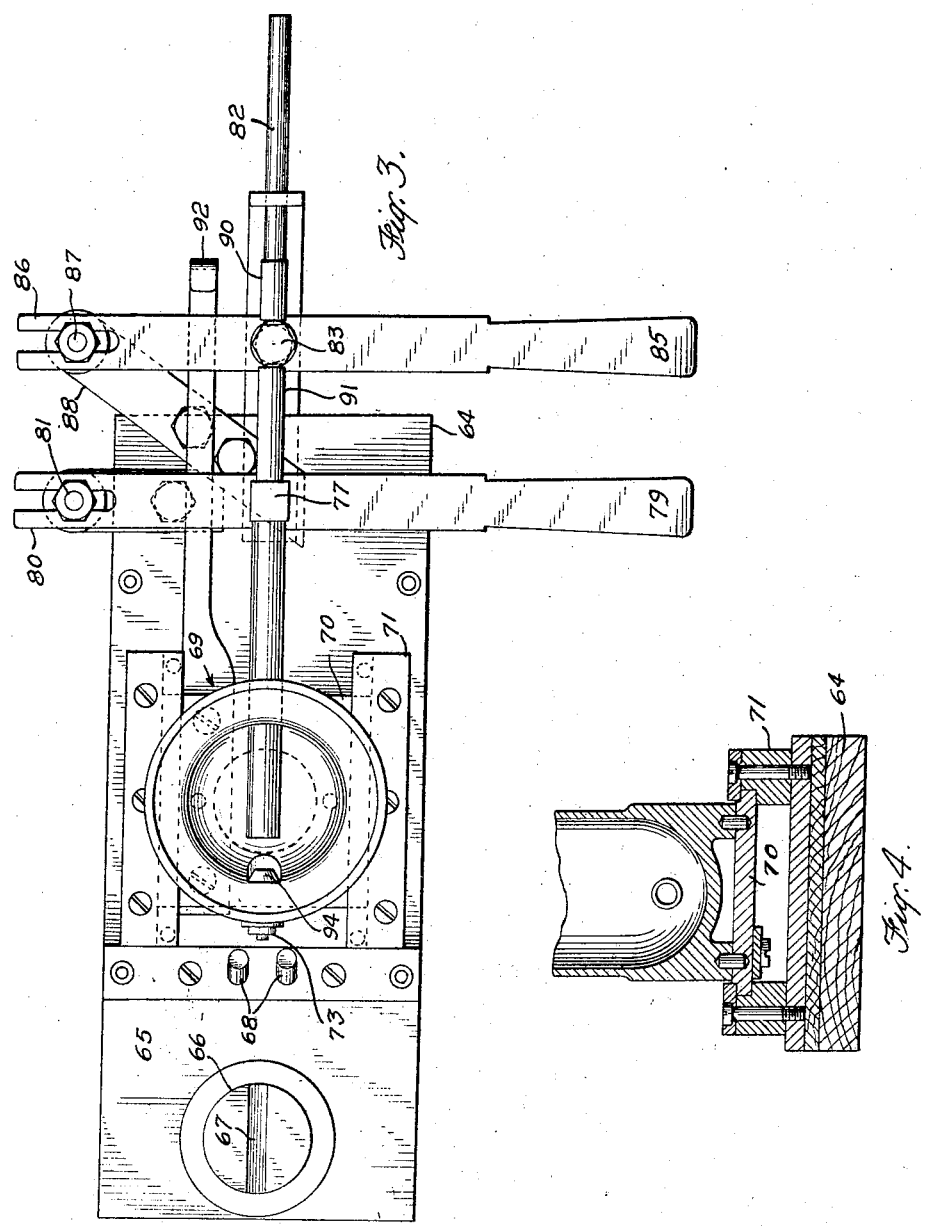
INVENTOR
ALFRED B. SCHUPP
BY Morris & Nolte
ATTORNEY Patented Mar. 3, 1931

1,795,236

UNITED STATES PATENT OFFICE

ALFRED B. SCHUPP, OF RICHMOND HILL, NEW YORK, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

MATERIAL INJECTOR

Original application filed October 31, 1925, Serial No. 66,123. Divided and this application filed January 24, 1928. Serial No. 249,101.

This invention relates to mechanism for filling hollow bodies with melted material, and has for its object to provide an apparatus whereby a succession of work pieces can be filled expeditiously and with assurance that the work will be done properly and in a uniform manner.

More particularly the invention relates to the injection of a packing composition into the hollow stems of heat indicating instruments, and for the purpose of illustration is described herein in connection with temperature responsive instruments of the kind employed for indicating motor operating conditions.

Other objects and advantages will hereinafter appear.

The present application is a division of my pending application, Serial No. 66,123, filed October 31, 1925, for indicating instruments and their manufacture.

In the drawings:

Figure 1 is a front elevation, partly in section, of an assembled heat indicating instrument with the packing material therein;

Figure 2 is a longitudinal, vertical elevation, partly in section of the material inserting apparatus;

Figure 3 is a plan view of such apparatus; and

Figure 4 is a fragmentary, transverse, sectional elevation showing the mounting of the melting pot.

The heat indicating instrument which it is an object of the present invention to produce, comprises a circular body portion 1 having a base 2 provided with a radial opening therethrough. A hollow stem 3 is permanently secured in the lower end of the base 2. A cork sleeve 4 is mounted in the upper end of the passage formed by the opening in the body base and the bore of the hollow stem 3. A glass thermometer tube 5 is mounted in this cork sleeve with its indicator portion extending up into the circular cavity 6 of the body portion in position to cooperate with a suitable scale plate (not shown). The lower end of the thermometer tube which is filled with a temperature responsive liquid such as alcohol, extends below the cork sleeve to a point near the lower end of the hollow stem 3. The lower end of the thermometer is surrounded by a closely packed filler 7 composed principally of graphite and wax. The lower end of the stem is closed by means of a sealing cap 8.

The wax and graphite composition 7 is inserted through the lower end of the stem 3 after the parts have been assembled, as shown in Figure 1, but before the application of the cap 8 to the stem. The apparatus for carrying out this operation is shown in Figures 2, 3 and 4.

This apparatus comprises a base 64 having a block 65 therein which carries a circular jig 66 having an open tube receiving channel 67 extending diametrically through it. Pins 68 rising from the base embrace the instrument stem and position it for receiving the filler material. A melting pot 69 is carried by a slide 70 mounted in guides 71 on the base and is reciprocable through a limited range toward and from the instrument stem. This melting pot includes electrical heating means 70 for melting the filler material. The pot has a threaded extension 71 in the lower portion thereof into which a nipple 72 is threaded. The nipple 72 has a seat 73 at the outer end thereof which is adapted to closely fit the lower end of the instrument stem when thrust thereagainst. The nipple 72 has a passage 74 through it of small size, through which the melted filler composition may be forced under pressure into the instrument stem.

A sleeve 75 is slidably mounted in a bearing 76 formed in the lower end of the melting pot in line with the nipple 72. This sleeve is connected at its rear end to a collar 77 having a stem 78 depending therefrom and pivotally connected through said stem with a handle 79. The handle 79 is bifurcated, as shown at 80, to slidingly receive a fulcrum bolt 81 that rises from the base.

A plunger 82 is slidable in the sleeve 75 and is secured to a collar 83 having a stem 84 depending therefrom that is pivotally connected with an operating handle 85. This operating handle 85 is bifurcated at 86 to slidingly embrace a fulcrum pin 87 carried by an arm 88 mounted on the base. The plunger 82 extends rearwardly beyond the sleeve 83, and is supported and guided by a bearing bracket 89 that extends rearwardly and upwardly from the base 64. A sleeve 90 between the collar 83 and the bearing bracket 89, rides loosely upon the plunger 82 and serves by engagement with the bracket 89 to limit retractive movement of the handle 85. A similar sleeve 91 rides loosely upon the plunger 82 between the collars 77 and 83 and serves as an operating connection for enabling the plunger as well as the sleeve 75 to be operated by the handle 79 in its retractive movement. The melting pot slide 70 is provided with a long rearwardly extending hook 92 that extends upwardly in position to be engaged by the handle 85 in its retractive movement.

The operation of the parts described is as follows: When the operator has placed an instrument on the jig he seizes the handle 79 with the forefinger of his right hand and draws it toward the left. This moves the sleeve 75 to bring a conical seat 93 at its left end into engagement with a complementary conical seat 94 on the inner end of the nipple 72. A quantity of the melted filler composition is thus trapped in the sleeve 75 between the plunger 82 and the nipple 72. Further movement of the plunger 75 moves the melting pot toward the left to press the seat 73 of the nipple into snug engagement with the lower end of the instrument stem 3. The operator now draws the handle 85 toward the left with other fingers of his right hand, while maintaining pressure upon the handle 79. In this way pressure is exerted upon the trapped filler material within the sleeve to force it out through the restricted passage 74 into the hollow instrument stem.

When the stem is completely filled, the operator moves the handle 79 toward the right. This withdraws the sleeve 75 and, through sleeve 91 and collar 83, withdraws the plunger 82, also. Collar 83, carrying the handle 85 with it, causes said handle to pick up the hook 82 and move the melting pot toward the right. Movement of the parts in this direction is finally arrested by engagement of the sleeve 90 with the bracket 89. The withdrawal of the seat 73 from engagement with the instrument stem leaves the passage 74 open to spill the contents of the melting pot. This passage is of such small bore, however, and the graphitic composition solidifies so rapidly that the passage ordinarily freezes closed without losing any of the filler composition. It is important to this operation that the heating means is located at some distance above the nipple 72 and does not transmit any great amount of heat to the nipple.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

I claim:

1. In a machine for injecting molten filler material into hollow instruments, in combination, a melting pot for the filler material having an unobstructed delivery opening and a seat surrounding the opening, means for heating the melting pot at a distance away from the delivery opening, a jig for positioning the instrument, means for relatively moving the pot and jig to press the seat against the instrument to prevent escape of filler material forced through the delivery opening, means for trapping a portion of the filler material in the melting pot adjacent said opening, and means for forcing the trapped material through the opening under pressure.

2. In a machine for injecting filler material into hollow instruments, in combination, a jig for positioning the instrument, a melting pot for the filler material having a delivery opening and a seat surrounding the opening, a barrel movable to trap a portion of the filler material adjacent the opening, means for moving the barrel to trap the material and for moving the pot to engage said seat with the instrument, and means for forcing the trapped material through the opening and into the instrument under pressure 3. In a machine for injecting molten filler material into hollow instruments, in combination, a jig for positioning the instrument, a melting pot for the filler material having an unobstructed delivery opening in the lower portion thereof, means for heating the melting pot at a distance away from the delivery opening, a barrel movable to trap a portion of the filler material adjacent the opening and to move the melting pot into sealing engagement with the instrument, a plunger movable to force the trapped filler material through the opening under pressure, and separate levers for operating the barrel and the plunger respectively extending in close proximity to one another and in substantially the same direction, so that they may be actuated successively and held simultaneously by different fingers of the same hand.

4. In a machine for injecting filler material into hollow instruments, in combination, a jig for positioning the instrument, a melting pot slidably mounted for movement toward and from the jig, a sleeve operable in the lower portion of the pot to trap a portion of the filler material adjacent said opening, said sleeve being also effective to move the pot into firm engagement with the jigged instrument, means for operating the sleeve to trap the material and then to move the pot, a plunger operable in the sleeve to force the trapped material out through the opening under pressure, means for operating said plunger and means forming a lost motion connection between the melting pot and said plunger operating means for retracting the melting pot.

5. A machine as set forth in claim 4 in which provision is made of means for retracting the sleeve and of means for causing the retraction of said sleeve to retract the plunger and the melting pot also.

In testimony whereof I have affixed my signature to this specification.

ALF. B. SCHUPP.